Patented Aug. 10, 1926.

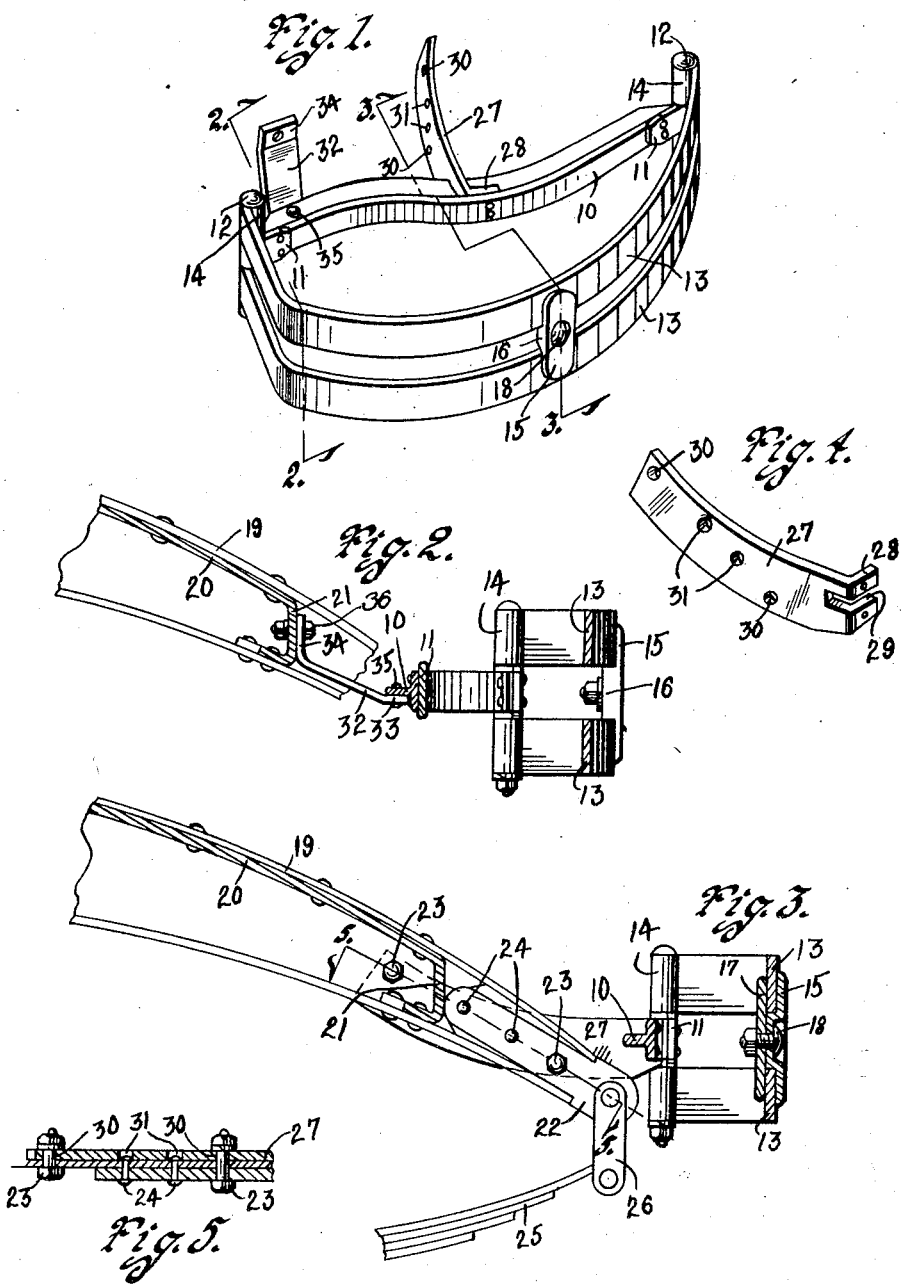

1,595,680

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

FENDER GUARD AND SUPPORT.

Application filed May 10, 1926. Serial No. 107,995.

The object of my invention is to provide a fender guard of simple, durable and comparatively inexpensive construction.

More particularly my invention relates to a fender guard and support wherein the fender guard may be positioned just rearwardly of the fender of the automobile and secured to the frame and parts of the automobile whereby the fender guard will be rigidly supported in position to protect the fender.

Still a further object is to provide a support for the fender guard employing the standard parts of the automobile frame and body as means of connection whereby the entire fender guard may be rigidly secured upon the automobile without the necessity of modifying any of the parts now found upon such automobiles and my present fender guard is adaptable for use in connection with the well known make of Dodge automobile although it may be used upon other types and makes of automobiles.

With these and other objects in view, my invention consists in the construction, arrangement, and combination of the various parts of my fender guard and support, whereby the objects contemplated are attained, as hereinafter more fully set forth, pointed out in my claims, and illustrated in the accompanying drawings, in which:

Figure 1 is a perspective view of my improved fender guard and support therefor.

Figure 2 is a sectional view taken on line 2—2 of Figure 1, showing the brace connection between the fender guard and the automobile body.

Figure 3 is a sectional view taken on line 3—3 of Figure 1 showing the support for the fender guard and its connection with the chassis of the automobile.

Figure 4 is a perspective view of the support alone, and

Figure 5 is a sectional view taken on line 5—5 of Figure 3 showing the connection between the support and the chassis.

My improved fender guard includes a rigid T-iron member 10 bent to form a reverse curve. The ends of the member 10 have riveted thereto eyelets 11 which receive bolts 12. The bolts 12 project above and below the eyelets 11.

Curved bumper or fender guard elements 13 are spaced above and below the eyelets 11 and have their ends bent so as to form eyelets 14 which register with the eyelets 11 and receive the bolts 12.

From the construction of the parts just described it will be seen that the two bumper or fender guard elements 13 are spaced one above another and connected to the rigid member 10 by means of the bolts 12.

A spacing element 15 is received between the two bumper elements 13 and tends to hold the two bumper elements spaced apart. The element 15 is formed with a pair of inturned flanges 16 and a plate 17 on the inner side of the bumper elements 13, is connected to the spacer element 15 by the bolt 18.

The parts heretofore described comprise the fender guard for each of the rear fenders of an automobile and I will now describe the supporting means for fastening the fender guard to the automobile frame.

The automobile frame 19 includes a downwardly inclined horn which is channel shaped and this part projects rearwardly beyond the body of the car itself. The body of the car includes a sheet metal member 20 which is connected to the channel shaped frame 19 and serves as a cover for the gas tank of the automobile and as a finish for the rear-end making a neater appearing structure.

In the particular form shown in the drawing the member 20 is formed with two parts arranged parallel with the upper and lower channel flanges of the frame 19 and these parts are connected together by a cross or vertically arranged wall 21 to which a brace of my fender guard is secured.

The rear end of the frame 19 is fixed to a fitting 22. The fitting 22 is connected to the frame by a pair of bolts 23 and a pair of rivets 24.

The automobile spring 25 is connected to the fitting 22 through the shackles and shackle-bolts 26. Fixed to the rigid member 10 of the fender guard is a forwardly extending supporting member or element 27. The supporting member 27 as shown in the drawings, is formed of a flat piece of metal having its rear end bent at right angles to the main body portion thereof as at 28. The portion 28 is bifurcated as at 29 so as to straddle the leg of the T-shaped member 10.

The portions 28 above and below the leg of the T-shaped member 10 are riveted or otherwise secured to the member 10. By fastening the two portions 28 to the T-cross member 10 and having them straddle the leg thereof, gives me a very rigid connection between the supporting element and the cross member 10.

The supporting element is connected to the cross member 10 substantially midway between the ends thereof. The supporting element extends forwardly and is connected to the outer side of the frame 19 by means of the bolts 23.

The supporting element or member 27 is formed with a pair of openings 30 which are designed to receive the bolts 23 normally provided for connecting the fitting 22 to the frame 19.

In order to install the supporting member all that is necessary is to remove the two bolts 23, insert them in the openings 30 and thereafter tighten the bolts 23.

Between the two openings 30 of the supporting member 27 I provide a pair of openings 31 which are designed to receive the heads of the rivets 24 as clearly shown in Figure 5 of the drawings.

The openings 31 permit the flat supporting member 27 to lie flat against the side of the frame 19. The supporting member 27 is curved upwardly between its ends so as to conform to the downwardly inclined horn end of the frame 19.

In order to brace the fender guard against lateral movement I secure to the cross member 10 at its inner end a brace element 32. The brace element 32 is formed of a flat piece of bar iron and has its ends bent at right-angles to each other so as to form a horizontal fastening flange 33 and a vertical fastening flange 34 connected together by an upwardly inclined body portion.

The fastening flange 33 fits in under the leg of the T-shaped cross member 10 and is secured thereto by the rivets or the like 35. The brace element 32 extends upwardly and forwardly from the fender guard and has the vertical fastening flange 34 rest against the wall 21 of the sheet metal member 20. The brace element 32 is fastened to the wall 21 by a bolt or the like 36.

From the construction of the parts just described it will be seen that the fender guard is actually supported upon the frame of the automobile by a supporting member 27 and braced against any twisting movement by the element 32.

The element 32 of course, assists in the supporting of the entire fender guard. I have thus provided a fender guard structure having a rigid and sturdy connection with the car frame and which can be installed using the standard parts of the car frame itself.

I claim as my invention:—

1. In a device of the class described the combination of a car body having longitudinal and transverse parts, the longitudinal part forming a downwardly inclined horn with a fender guard comprising a T-shaped rigid cross member, bumper elements secured thereto at the ends thereof, a supporting element fixed to said cross member between its ends and projecting forwardly therefrom, said supporting element being curved upwardly between its ends and adapted to conform to the downwardly inclined horn of the car body, means for fastening the supporting element to the downwardly inclined horn and a brace fixed to said cross member at one end thereof and adapted to project forwardly and toward the car body from said cross member, said brace element having a vertically arranged flange for connection with the car body at a point spaced from the connection between the car body and supporting element whereby the fender guard will be braced and supported upon the car body.

2. In a device of the class described the combination of a car body having longitudinal and transverse parts, the longitudinal part forming a downwardly inclined horn with a fender guard comprising a cross member, bumper elements secured thereto, a supporting element fixed to said cross member between its ends and projecting forwardly therefrom, said supporting element being curved upwardly between its ends and adapted to conform to the downwardly inclined horn of the car body, means for fastening the supporting element to the downwardly inclined horn and a brace fixed to said cross member at one end thereof and adapted to project forwardly and upwardly toward the car body from said cross member, said brace element having a vertically arranged flange for connection with the car body at a point spaced from the connection between the car body and supporting element whereby the fender guard will be braced and supported upon the car body.

3. In a device of the class described the combination of a car body having longitudinal and transverse parts, the longitudinal part forming a downwardly inclined horn with a fender guard comprising a cross member, bumper elements secured thereto, a supporting element fixed to said cross member between its ends and projecting forwardly therefrom, said supporting element being curved upwardly between its ends and adapted to conform to the downwardly inclined horn of the car body, means for fastening the supporting element to the downwardly inclined horn and a brace having its ends formed with flanges at right angles to each other and its body portion inclined from one of said flanges to the other of said flanges, one of said flanges being connected to the fender guard and the other to the car body whereby the fender guard will be braced and supported upon the car body.

4. In a fender guard and support therefor for use in connection with an automobile, a fender guard including a cross member, spaced bumper elements secured thereto, a supporting element fixed to said cross member between its ends said supporting element being curved from end to end and having spaced openings therein for receiving fastening devices, a brace fixed to said cross member at a point spaced from the connection of the supporting element with the cross member and adapted to project forwardly and upwardly toward the automobile upon which said fender guard is secured, the inner end of said brace having a flat portion adapted to rest against the automobile and be secured thereto.

Des Moines, Iowa, April 21, 1926.

ALGOT W. NORDGREN.